United States Patent [19]
Kim et al.

[11] Patent Number: 5,946,442
[45] Date of Patent: *Aug. 31, 1999

[54] HIGH-SPEED VIDEO TAPE COPIER

[75] Inventors: Chul-min Kim, Anyang, Rep. of Korea; Masamitsu Seki, Tokyo, Japan

[73] Assignee: Samsung Electronics Co., Ltd., Kyungki-do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/722,876

[22] Filed: Sep. 26, 1996

[30] Foreign Application Priority Data

Sep. 26, 1995 [KR] Rep. of Korea ...................... 95-31910
Oct. 10, 1995 [KR] Rep. of Korea ...................... 95-34760
Oct. 10, 1995 [KR] Rep. of Korea ...................... 95-34762

[51] Int. Cl.$^6$ .............................. H04N 9/79; H04N 5/783
[52] U.S. Cl. ...................... 386/4; 386/54; 386/6
[58] Field of Search .................................. 386/1, 4, 6, 44, 386/46, 52, 54, 21–22, 39, 26, 29, 96, 97–100, 113–115; 360/13, 15; H04N 5/76, 5/92, 5/91, 9/79

[56] References Cited

U.S. PATENT DOCUMENTS

| | | | |
|---|---|---|---|
| 4,486,789 | 12/1984 | Hirota et al. ................................ | 386/39 |
| 4,556,917 | 12/1985 | Shibata et al. .............................. | 386/39 |
| 4,580,174 | 4/1986 | Tokunaka ................................... | 386/39 |
| 4,651,230 | 3/1987 | Hagita et al. .............................. | 386/39 |
| 4,752,832 | 6/1988 | Higurashi ................................... | 386/39 |
| 5,023,707 | 6/1991 | Briggs ....................................... | 386/97 |
| 5,063,452 | 11/1991 | Higurashi ................................... | 386/39 |
| 5,142,375 | 8/1992 | Fukuda et al. ............................ | 386/26 |
| 5,194,963 | 3/1993 | Dunlap et al. ............................ | 386/39 |
| 5,260,800 | 11/1993 | Sturm et al. ............................... | 386/6 |
| 5,287,196 | 2/1994 | Yamashita et al. ........................ | 386/39 |
| 5,392,164 | 2/1995 | Takahashi ................................. | 386/52 |
| 5,414,566 | 5/1995 | Oba et al. .................................. | 386/54 |
| 5,481,411 | 1/1996 | Nakatani ................................... | 386/4 |
| 5,561,530 | 10/1996 | Kanazawa ................................ | 386/113 |
| 5,608,531 | 3/1997 | Honda et al. .............................. | 386/1 |
| 5,636,311 | 6/1997 | Nakatani ................................... | 386/54 |
| 5,647,047 | 7/1997 | Nagasawa ................................. | 386/52 |

*Primary Examiner*—Thai Tran
*Attorney, Agent, or Firm*—Sughrue, Mion, Zinn, Macpeak & Seas, PLLC

[57] ABSTRACT

A video tape copier, particularly a high-speed video tape copier for rapidly copying a video signal from a video tape onto another video tape. The high-speed video tape copier plays back a video tape at an N-tuple speed, band-passes the frequencies of video and audio signals having N-tuple frequencies, respectively, removes noise from the signal, and records the noise-free reproduced signal on another video tape at an N-tuple speed. Further, the video signal can be monitored regardless of whether the video signal is being accurately copied by dividing the frequency of the video signal reproduced at the N-tuple speed by N and displaying the frequency-divided signal as a normal speed video signal on a monitor.

11 Claims, 3 Drawing Sheets

$f_1' = f_1 \times N \qquad f_2' = f_2 \times N$ $f_L' = f_L \times N \quad f_R' = f_R \times N$

5,946,442

HIGH-SPEED VIDEO TAPE COPIER

BACKGROUND OF THE INVENTION

The present invention relates to a video tape copier, and more particularly, to a high-speed video tape copier for rapidly copying a video signal from one video tape onto another video tape.

Generally, in a video tape copying method, a video signal is reproduced from an original video tape of one video tape recorder (VTR) and recorded on a video tape of another VTR. A distinct drawback of the video tape copying method is that high speed dubbing is impossible since the rotating speed of the video tape is limited by the recording mode of the video tape.

Therefore, there has been a need for a video tape copier which can reduce the time required for copying a video tape and thus enable rapid, large scale dubbing.

SUMMARY OF THE INVENTION

To satisfy the above-mentioned need, the object of the present invention is to provide a high-speed video tape copier for rapidly dubbing a video tape with substantially reduced time for copying.

To achieve the above object, there is provided a high-speed video tape copier comprising: an instruction inputting means for inputting an instruction for copying a first video tape at an N-tuple speed; a first transport mechanism for reproducing a video signal and a hi-fi audio signal at an N-tuple speed under the instruction of the instruction inputting means; a chrominance signal processing means for extracting a chrominance signal having an N-tuple frequency from the video signal and processing the chrominance signal; a luminance signal processor for passing only a luminance signal having an n-tuple frequency from the video signal and processing the luminance signal; an audio signal processing means for processing the audio signal; a monitoring means for combining the chrominance signal and the luminance signal reproduced to monitor; a combining means for mixing the chrominance signal output from the chrominance signal processing means and the luminance signal output from the luminance signal processing means, and combining the audio signal output from the audio signal processing means; a second transport mechanism for recording the signal combined in the mixing portion on a second video tape at the N-tuple speed; and a controlling means for controlling the speed of the first and second transport mechanisms at the N-tuple speed according to instructions of the instruction inputting means.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
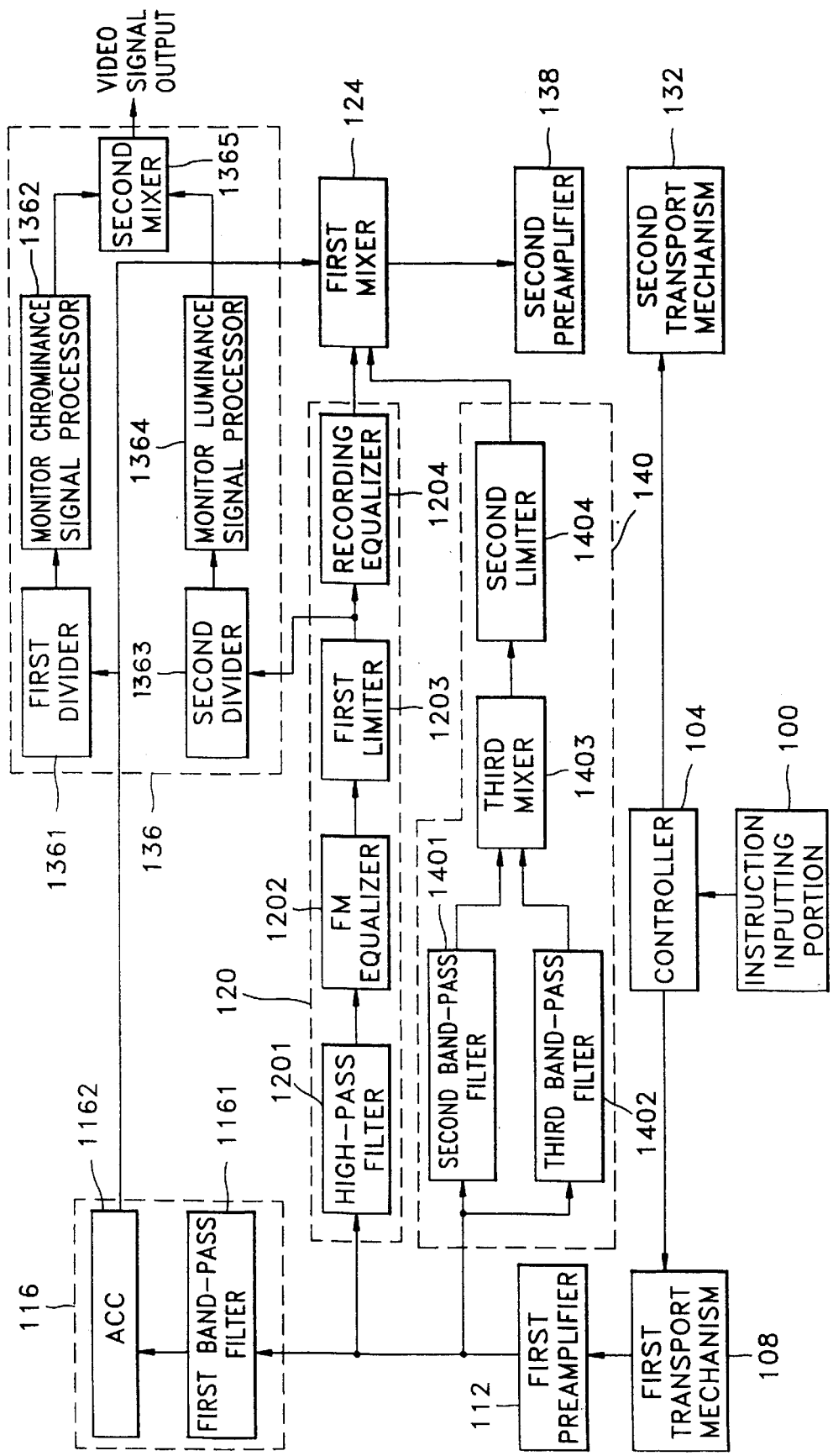
FIG. 1 is a block diagram of a high-speed video tape copier according to the present invention.

A high-speed video tape copier of FIG. 1 includes an instruction inputting portion 100, a controller 104, a first transport mechanism 108, a first preamplifier 112, a chrominance signal processor 116, a luminance signal processor 120, a first mixer 124, a second preamplifier 138, a second transport mechanism 132, a monitor signal processor 136, and an audio signal processor 140.

The chrominance signal processor 116 includes a first band-pass filter 1161 for selectively passing a chrominance signal in a video signal received from the first preamplifier 112, and an automatic chrominance controller (ACC) 1162 for stabilizing the level of a chrominance signal which is unstable due to noise produced during a high-speed playback.

The luminance signal processor 120 includes a high-pass filter 1201 for selectively passing a frequency-modulated (FM) luminance signal in the video signal received from the first preamplifier 112, a frequency modulation (FM) equalizer 1202 for compensating for the attenuation in the frequency characteristics of the FM luminance signal due to the property of a video tape and heads, a first limiter 1203 for limiting the level of the compensated signal which varies in amplitude due to noise, and a recording equalizer 1204 for compensating for the luminance signal in consideration of the characteristics of a recording head and a recording tape.

The audio signal processor 140 includes second and third band-pass filters 1401 and 1402 for selectively passing the frequency band of L-channel and R-channel FM audio signals in the signal received from the first preamplifier 112, respectively, a third mixer 1403 for combining the outputs of the second and the third band-pass filters 1401 and 1402, and a second limiter 1404 for removing noise from the combined audio signal.

The monitor signal processor 136 includes a first divider 1361 for dividing the frequency of the chrominance signal output from the ACC 1162 and having N-tuple frequency by N, a monitor chrominance signal processor 1362 for processing the chrominance signal in the same manner as in a general VTR, a second divider 1363 for dividing the frequency of the luminance signal output from the first limiter 1203 and having N-tuple frequency by N, a monitor luminance signal processor 1364 for demodulating the FM-luminance signal having the frequency divided by N in the second divider 1363 and processing it in the same manner as in the general VTR, and a second mixer 1365 for combining the signals processed in the monitor chrominance signal processor 1362 and the monitor luminance signal processor 1364.

The operation of the device shown in FIG. 1 will be described below.

When the instruction inputting portion 100 issues an instruction for an N-tuple speed copy, the controller 104 generates a control signal and outputs such signal to the first transport mechanism 108 such that the first transport mechanism plays back a video tape at the N-tuple speed. As a result, the first transport mechanism 108 reproduces recorded audio and video signals at the N-tuple speed and supplies them to the first preamplifier 112. The first preamplifier 112 amplifies the N times faster signals such that they can be processed, and outputs the amplified signals to the chrominance signal processor 116, the luminance signal processor 120, and the audio signal processor 140.

Figure 2A:
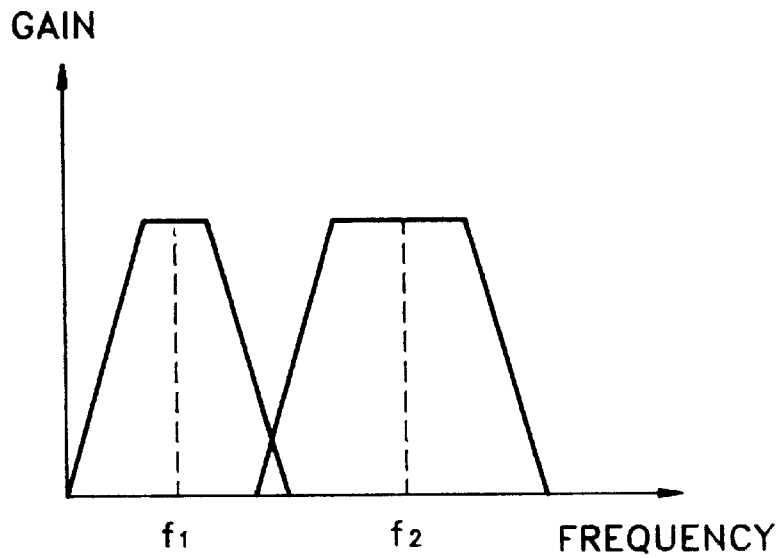
FIG. 2A shows a frequency spectra of reproduced chrominance and luminance signals during a normal speed playback.
Figure 2B:
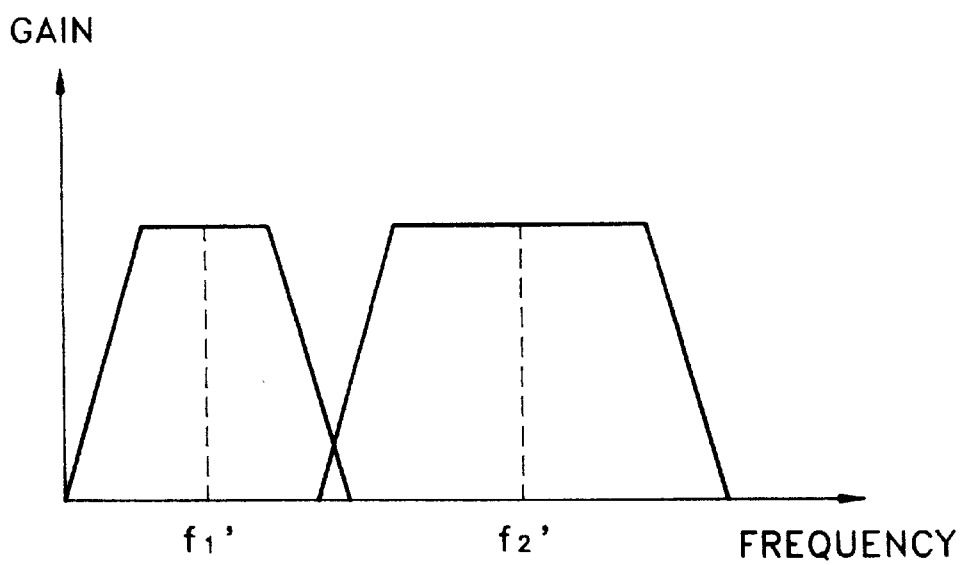
FIG. 2B shows a frequency spectra of reproduced chrominance and luminance signals during an N-tuple speed playback.

FIG. 2A illustrates the frequency spectra of the chrominance and luminance signals reproduced during a normal speed playback, and FIG. 2B illustrates the frequency spectra of the chrominance and luminance signals reproduced during an N-tuple speed playback.

In FIG. 2A, $f_1$ indicates the central frequency of the chrominance signal output from the first transport mechanism 108, which is converted into a low pass signal. Also, $f_2$ indicates the carrier frequency of a frequency-modulated luminance signal during the normal speed playback. In case of the NTSC system, $f_1$ is 629 KHz, and $f_2$ is 3.4 MHz.

In FIG. 2B, $f_1'$ indicates the central frequency of the chrominance signal during the N-tuple speed playback, which is N times larger than $f_1$, and $f_2'$ indicates the carrier frequency of an FM-modulated luminance signal during the N-tuple speed playback, which is N times larger than $f_2$.

Therefore, the first band-pass filter 1161 has a central frequency N times higher than that of a band-pass filter for passing the frequency of a chrominance signal in a general VTR. Also, the first band-pass filter 1161 has a bandwidth N times wider than that of a band-pass filter for a general VTR.

The ACC 1162 receives the chrominance signal output from the first band-pass filter 1161. Since the chrominance signal reproduced at the N-tuple speed is an amplitude-modulated (AM) signal, transport noise increases during a high-speed tape reproduction. To compensate for the increase in noise, the ACC 1162 stabilizes the level of the chrominance signal and outputs the stabilized signal to the first mixer 124.

Meanwhile, the high-pass filter 1201 has a cut-off frequency N-times higher than that of a high-pass filter in a general VTR. The FM equalizer 1202 receives the luminance signal output from the high-pass filter 1201, compensates the attenuation caused by video tape and head characteristics, and outputs such signal to the first limiter 1203.

The first limiter 1203 limits the level of the compensated signal which varies in amplitude due to noise, and outputs the amplitude-limited signal to the second divider 1363 and the recording equalizer 1204. The recording equalizer 1204 suppresses the high-frequency component of the luminance signal to improve the frequency characteristics thereof and outputs such signal to the first mixer 124.

Figure 3A:
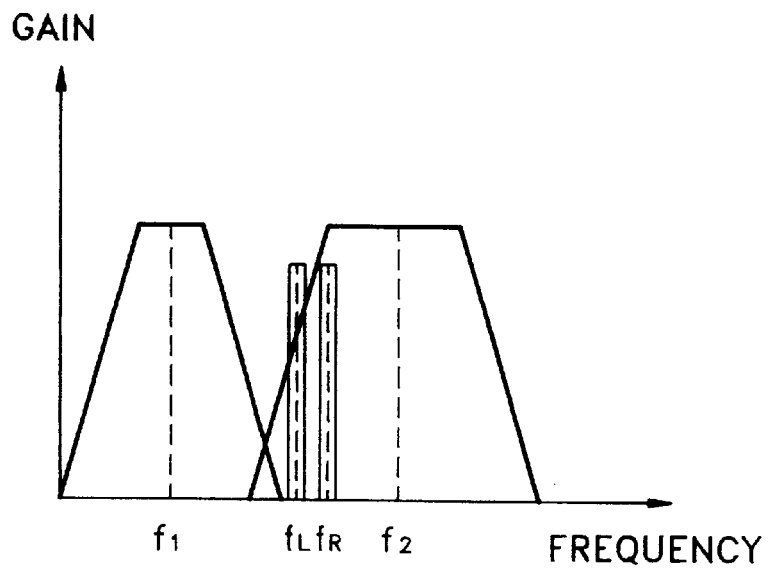
FIG. 3A shows a frequency spectra of reproduced hi-fi audio signals during a normal speed playback incorporated to those of chrominance and luminance signals in FIG. 2A.

Meanwhile, in an NTSC system, the audio signals of left and right channels are recorded on a video tape in the frequency band range of 1.3 MHZ±50 KHz and 1.7 MHz±50 KHz, respectively. When a signal recorded on the video tape is reproduced in the first transport mechanism 108 at an N-tuple speed, the central frequencies $f_L$ and $f_R$ and the bandwidth of the spectra of the left and right channels increase by N times. FIG. 3A shows the frequency spectra of reproduced hi-fi audio signals during a normal speed playback, and FIG. 3B shows the frequency spectra of reproduced video and hi-fi audio signals during an N-tuple speed playback, both of which are incorporated to the spectra of corresponding chrominance and luminance signals.

In FIG. 3A, $f_L$ indicates the central frequency of an frequency-modulated audio signal of the left channel during a normal speed playback, and $f_R$ indicates the central frequency of an frequency-modulated audio signal of the right channel during the normal speed playback.

Figure 3B:
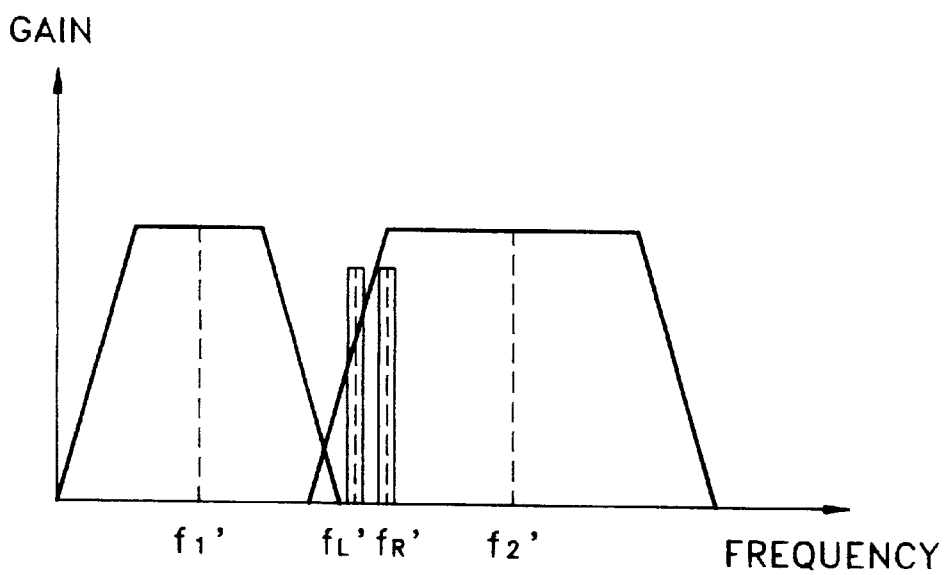
FIG. 3B shows a frequency spectra of reproduced hi-fi audio signals during an N-tuple speed playback incorporated to those of chrominance and luminance signals in FIG. 2B.

In FIG. 3B, $f_L'$ indicates the central frequency of an frequency-modulated audio signal of the left channel during an N-tuple speed playback, which is N times larger than $f_L$, and $f_R'$ indicates the central frequency of an frequency-modulated audio signal of the right channel during the N-tuple speed playback, which is N times larger than $f_R$.

The audio signal processor 140 receives the reproduced signal of N-tuple frequency output from the first amplifier 112. The second and third band-pass filters 1401 and 1402 selectively pass the frequencies of the left and right channels of the hi-fi audio signal, and output them to the third mixer 1403. The second limiter 1404 removes noise from the mixed audio signals of the third mixer 1403, thus preventing signal deterioration, and outputs them to the first mixer 124.

The first mixer 124 receives the luminance signal output from the REC EQ 1204, the chrominance signal output from the ACC 1162, and the audio signal output from the audio signal processor 140, and combines such signals. The second preamplifier 138 amplifies the combined signal such that the signal may be recorded at a proper level, and outputs the amplified signal to the second transport mechanism 132.

The second transport mechanism 132 records the video signal received from the second preamplifier 138 on a video tape at the N-tuple speed under control of the controller 104. On the other hand, when the video tape being reproduced has been recorded in a super long playback (SLP) mode, cross-talk between adjacent channels exists during the playback since there is no gap between the channels on the tape. The cross-talk increases when the signals are reproduced at the N-tuple speed.

In order to reduce the cross-talk, narrow exclusive-use heads may be used for the first and second transport mechanisms. Alternatively, narrow exclusive-use heads for the SLP mode may be incorporated in the first and the second transport mechanisms in addition to the general heads.

The first divider 1361 of the monitor signal processor 136 inputs the chrominance signal of N-tuple frequency output from the ACC 1162, and divides the frequency of such signal by N.

The monitor chrominance signal processor 1362 translates the frequency band of the chrominance signal, which is centered at 629 KHz to 3.58 MHZ in the same manner as the general VTR, and processes the translated signal, to apply such signal to the second mixer 1365.

Further, the second divider 1363 divides the frequency of the luminance signal output from the first limiter 1203, which is higher than a normal reproduced signal by N, and applies the frequency-divided signal to the monitor luminance signal processor 1364. The monitor luminance signal processor 1364 processes the divided luminance signal and applies the processed signal to the second mixer 1365.

The second mixer 1365 combines normal speed chrominance and luminance signals and outputs a video signal to be monitored on a television screen. The video signal can be displayed on the television screen using conventional technology.

As described above, the high-speed video tape copier of the present invention is capable of rapidly copying prerecorded video and audio signals on a video tape onto another video tape. Thus, the present invention reduces the time required to copy a video tape, while providing the function of monitoring a high-speed video signal dubbing on a TV screen.

In the description of the above embodiment, the frequency spectra of the composite video signal was described based on the NTSC system specification to merely illustrate the operation of the video cassette recorder. However, the scope of the present invention is not limited to the particular signal formats. Furthermore, it should be noted that the other aspects of the embodiment described above are illustrative and that the scope of the invention should not be limited by such embodiment.

What is claimed is:

1. A high-speed video tape copier comprising; instruction inputting means for inputting an instruction for copying a first video tape at an N-tuple speed, where N is greater than one;

a first transport mechanism for reproducing a video signal and an audio signal at said N-tuple speed in response to said instruction;

chrominance signal processing means for extracting a chrominance signal having an N-tuple frequency from said video signal;

luminance signal processing means for extracting only a luminance signal having an N-tuple frequency from said video signal and processing said luminance signal;

audio signal processing means for processing said audio signal;

monitoring means for combining said chrominance signal and said luminance signal and for outputting a combined signal for viewing;

combining means for mixing said chrominance signal output from said chrominance signal processing means and said luminance signal output from said luminance signal processing means, and for combining said audio signal output from said audio signal processing means;

a second transport mechanism for recording a signal output from said combining means onto a second video tape at said N-tuple speed; and controlling means for controlling the speed of said first and second transport mechanisms at said N-tuple speed according to said instruction from said inputting means.

2. The high-speed video tape copier as claimed in claim 1, wherein said first and second transport mechanisms each comprise narrow exclusive-use heads suitable for a high-density recording mode.

3. The high-speed video tape copier as claimed in claim 1, wherein said monitoring means divides the frequencies of said chrominance signal and said luminance signal reproduced at said N-tuple speed by N to produce a video signal for viewing.

4. The high-speed video tape copier as claimed in claim 1, wherein said chrominance signal processing means comprises:

a band-pass filter for selectively passing said chrominance signal reproduced at said N-multiple speed; and an automatic chrominance controller for automatically controlling the gain for said chrominance signal.

5. The high-speed video tape copier as claimed in claim 1, wherein said luminance signal processing means comprises:

a high-pass filter having a frequency N times higher than that required for playback of a video signal recorded at a speed suitable for viewing;

a FM equalizer;

a record equalizer for compensating for attenuation due to the frequency characteristics of a video tape and heads; and a first limiter for removing noise.

6. The high-speed video tape copier as claimed in claim 1, wherein said audio signal processing means comprises;

first and second band-pass filters for selectively passing left and right channel audio signals from said audio signal reproduced at the N-tuple speed, respectively;

a mixer for mixing said audio signals passed through said first and second band-pass filters to generate a mixed audio signal; and a limiter for removing noise from said mixed audio signal.

7. A high-speed video tape copying method comprising the steps of:

inputting an instruction for copying a first video tape at an N-tuple speed, where N is greater than one;

reproducing a video signal and an audio signal at said N-tuple speed in response to said instruction;

extracting a chrominance signal having an N-tuple frequency from said video signal;

extracting only a luminance signal having an N-tuple frequency from said video signal and processing said luminance signal;

processing the audio signal;

combining said chrominance signal and said luminance signal to generate a video signal suitable for viewing;

mixing said chrominance signal and said luminance signal and said audio signal to generate a combined signal;

recording said combined signal on a second video tape at said N-tuple speed; and controlling the speed of said first and second transport mechanisms at said N-tuple speed according to said instruction.

8. The high-speed video tape copying method as claimed in claim 7, wherein said combining step comprises the steps of dividing the frequency of said chrominance signal and said luminance signal reproduced at said N-tuple speed by N.

9. The high-speed video tape copying method as claimed in claim 7, wherein said step of extracting said chrominance signal comprises the steps of:

band-pass filtering said video signal for selectively passing a chrominance signal reproduced at said N-multiple speed; and automatically controlling the gain of said chrominance signal.

10. The high-speed video tape copying method as claimed in claim 7, wherein said step of extracting said luminance signal comprises the steps of:

high-pass filter said video signal;

FM equalizing said video signal;

compensating the attenuation due to the frequency characteristics of a video tape and heads; and removing noise.

11. The high-speed video tape copier as claimed in claim 7, wherein said step of processing said audio signal comprises the steps of:

selectively passing left and right channel audio signals from said audio signal reproduced at said N-tuple speed, respectively;

mixing said left and right channel audio signals; and removing noise from a mixed audio signal.

* * * * *